No. 751,130. PATENTED FEB. 2, 1904.
D. G. WOOD.
AXLE JOURNAL AND SKEIN.
APPLICATION FILED OCT. 5, 1903.
NO MODEL.
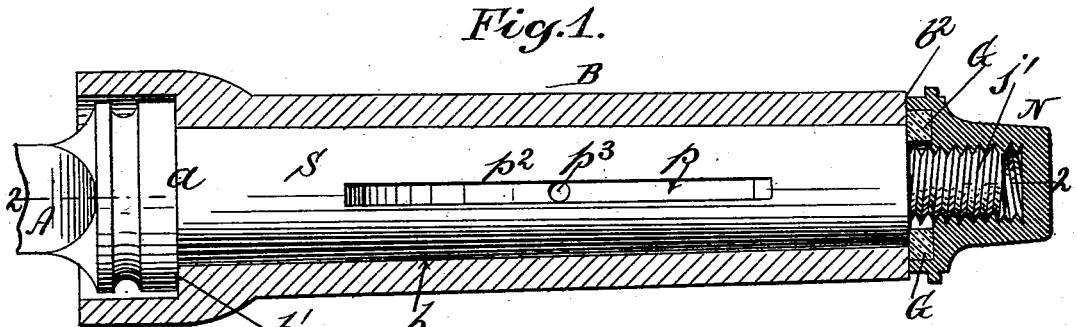
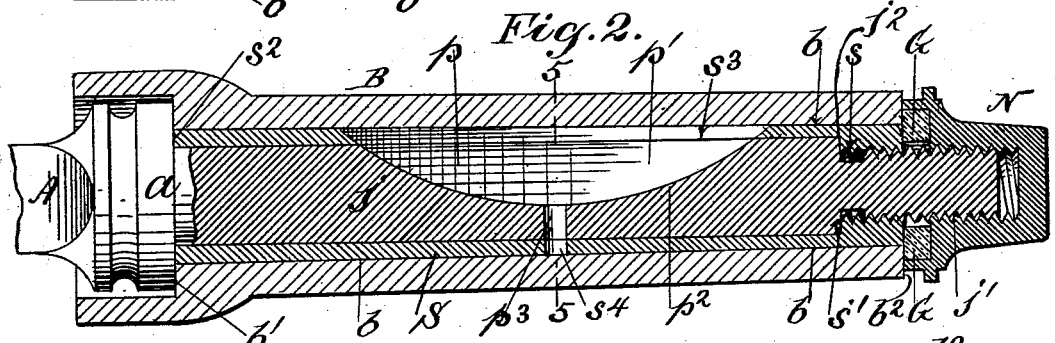
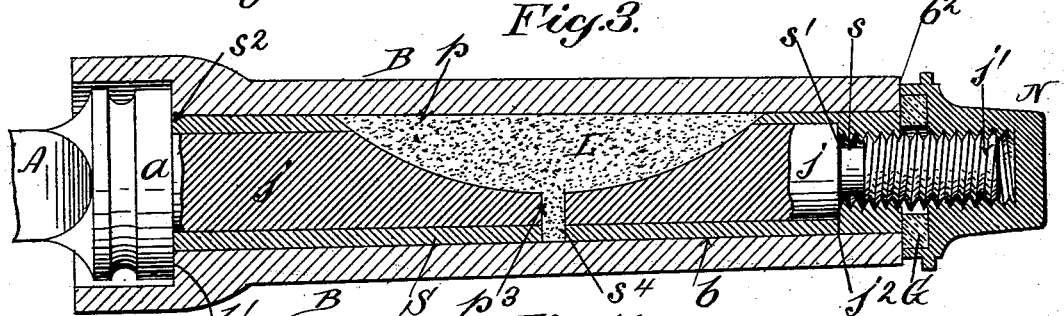
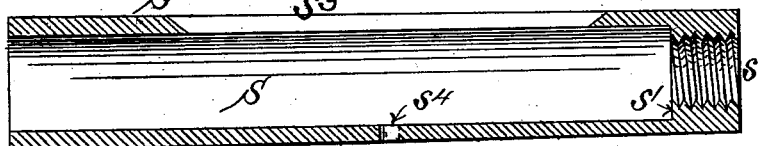
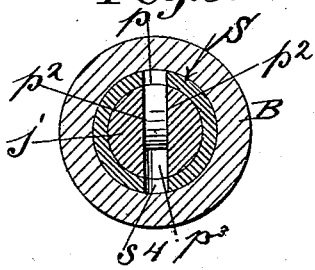
Witnesses:
Inventor:
David G. Wood
By his Attorney No. 751,130. Patented February 2, 1904.

UNITED STATES PATENT OFFICE.

DAVID G. WOOD, OF SUFFERN, NEW YORK.

AXLE JOURNAL AND SKEIN.

SPECIFICATION forming part of Letters Patent No. 751,130, dated February 2, 1904.

Application filed October 5, 1903. Serial No. 175,748. (No model.)

*To all whom it may concern:*

Be it known that I, DAVID G. WOOD, a citizen of the United States, residing at Suffern, Rockland county, and State of New York, have invented certain new and useful Improvements in Axle Journals and Skeins, of which the following is a specification sufficient to enable others skilled in the art to which the invention appertains to make and use the same.

My invention relates to an improved structure of axle journal and skein; and it consists in the special construction and arrangement of parts hereinafter described and claimed specifically.

In the accompanying drawings, Figure 1 is a longitudinal section of a hub-bushing or axle-box, showing an elevation of my improved skein and journal, the cap-nut and gasket being shown in section. Fig. 2 is a longitudinal section, partly in elevation, upon plane of line 2 2, Fig. 1; Fig. 3, a similar view showing the lubricant in place. Fig. 4 is a central longitudinal section of my improved skein; Fig. 5, a transverse section upon plane of line 5 5, Fig. 2.

The object of my construction is to afford a simple, cheap, and effective form of journal and skein and at the same time provide effectually for the lubrication of the opposed surfaces of the skein and axle-box or hub-bushing.

In the drawings, B represents an axle-box or hub-bushing of any kind, to which the hub (not shown) of the wheel is secured.

A is an axle formed with the journal $j$, preferably, though not necessarily, of cylindrical form. Between the axle A and the journal $j$ is the annular shoulder $a$, the opposite extremity of the journal $j$ being formed with the screw-thread $j'$ and annular shoulder $j^2$. The body of the journal is formed with a longitudinal recess or pocket $p$ for the reception of a lubricant L. This pocket $p$ is conveniently formed by the use of a saw or equivalent tool acting radially along the axial line of the journal $j$, so that the pocket $p$ has a relatively long mouth $p'$ and sides $p^2 p^2$ converging toward the bottom of the pocket, where the journal is preferably perforated to form the radial passage $p^3$ for the escape of the lubricant at that side of the journal.

S is the skein, preferably slightly conical in external configuration. The forward or outer end of the skein is formed with an internal female screw-thread $s$, which engages with the male screw-thread $j'$ upon the outer end of the journal. It is also formed with the internal annular shoulder $s'$ at the inner end of the internal screw-thread $s$, the distance between this internal annular shoulder $s'$ and the inner end $s^2$ of the skein being equal to the distance between the shoulder $j^2$ on the journal $j$ and the shoulder $a$ on the axle A, so that when the skein S is screwed home upon the journal $j$ the said internal shoulder $s'$ on the skein will engage the shoulder $j^2$ upon the journal $j$ and the inner end $s^2$ of the skein will rest against the shoulder of the axle $a$, as will be seen by reference to Figs. 2 and 3. When the skein is thus screwed home, the longitudinal slot $s^3$ in the skein coincides with and forms a continuation of the elongated mouth $p'$ of the lubricator-pocket $p$, while the opening $s^4$ in the skein coincides with the radial passage $p^3$ in the journal $j$, thereby providing for the escape of the lubricant from the pocket $p$ through the skein and to the inner surface $b$ of the hub-bushing B, which is rotatable upon the non-rotatable skein S.

A shoulder $b'$, formed at the inner end of the bushing B, rests against the axle-shoulder $a$, and the distance between the shoulder $b'$ and the outer end $b^2$ of the bushing is equal to the length of the skein S, so that a packing-gasket G and cap-nut N, common to both the bushing B and the skein S, may be used, the cap-nut engaging with the outer extremity of the male screw-thread $j'$ on the journal and the gasket G overlapping the adjoining edges of the said skein and bushing, so as to confine the lubricant between the opposed surfaces thereof while locking the hub-bushing B upon the skein S.

The lubricant-pocket $p$ is formed with its mouth on the upper side of the journal $j$ to facilitate the introduction and retention of the lubricant, and the converging side walls $p^2 p^2$ of the pocket tend to facilitate the delivery of the lubricant through the ports $p^3$ and $s^4$ to the opposed rotatable surface $b$ of the hub-bushing B, by which the lubricant is distributed over the external surface of the skein S. It will thus be seen that it is not necessary to remove the skein S from the journal in order to renew the supply of lubricant.

I have herein described the inner end $s^2$ of the skein as resting against the axle-shoulder $a$, and I prefer this construction, although it is not indispensable, since the contact of the internal shoulder $s'$ of the skein with the annular shoulder $j^2$ upon the journal $j$ can be relied upon to properly gage and preserve the desired relation of parts. In like manner where the inner end of the skein rests against the shoulder $a$ of the axle, and thereby acts as a gage, the shoulders $s'$ and $j^2$ may be dispensed with, if desired, the main object being where either or both stops are used to bring the outer end of the skein and that of the hub-bushing into coincidence, as hereinbefore set forth.

What I claim as my invention, and desire to secure by Letters Patent, is—

1. The combination of an axle formed with an annular shoulder, a journal formed integral with said axle and projecting from said annular shoulder, said journal being formed with lubricant-pocket and radial passage leading therefrom also formed with an annular shoulder and with a male screw-thread at or near its outer extremity, a skein formed with radial passage coincident with that of the journal and an internal annular shoulder engaging the said annular shoulder upon the journal, the outer end of the skein being also formed with a female screw-thread engaging the male screw-thread on the outer end of said journal, together with a cap-nut also engaging the male screw-thread on the outer end of the journal.

2. The combination of an axle formed with an annular shoulder, a journal formed integral with said axle and projecting from said annular shoulder, said journal being formed with lubricant-pocket and radial passage leading therefrom also formed with an annular shoulder and with a male screw-thread at or near its outer extremity, a skein formed with radial passage coincident with that of the journal and an internal annular shoulder engaging the said annular shoulder upon the said annular shoulder on the axle, the outer end of the skein being also formed with a female screw-thread engaging the male screw-thread on the outer end of the said journal, a hub-bushing having an annular shoulder at its inner end for engagement with the annular shoulder upon the axle, the length of the said hub-bushing between its said annular bearing-shoulder and its outer end being such that its said outer end coincides with the outer end of the skein when the internal annular shoulder of the latter is in engagement with the annular shoulder of the journal, and a cap-nut engaging the said male screw-thread on the outer end of the journal and bearing against the outer ends of both the hub-bushing and the skein.

3. The combination of the axle A formed with the shoulder $a$, and journal $j$, the latter formed at its outer end with the annular shoulder $j^2$, and male screw-thread $j'$, and also with the longitudinal lubricant-pocket $p$, converging sides $p^2$, $p^2$, and discharge-passage $p^3$, the skein S formed at its outer end with the annular shoulder $s'$ and female screw-thread $s$, and also formed with the openings $s^3$, and $s^4$, the hub-bushing B, formed with the shoulder $b'$, the distance between which and its forward end is equal to the length of the skein S, and the cap-nut N engaging the male screw-thread on the journal and bearing against the ends of both the hub-bushing B and the skein S for the purpose set forth.

DAVID G. WOOD.

Witnesses:
KATE A. WOOD,
GEO. WM. MIATT.